US011507784B2

(12) United States Patent
Finnie et al.

(10) Patent No.: US 11,507,784 B2
(45) Date of Patent: Nov. 22, 2022

(54) DEVICE AND METHOD OF DIGITAL IMAGE CONTENT RECOGNITION, TRAINING OF THE SAME

(71) Applicant: Robert Bosch GmbH, Stuttgart (DE)

(72) Inventors: Nicole Ying Finnie, Renningen (DE); Benedikt Sebastian Staffler, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 358 days.

(21) Appl. No.: 16/884,440

(22) Filed: May 27, 2020

(65) Prior Publication Data

US 2020/0380359 A1 Dec. 3, 2020

(30) Foreign Application Priority Data

Jun. 3, 2019 (EP) .................................... 19177833

(51) Int. Cl.
*G06V 10/82* (2022.01)
*G06K 9/62* (2022.01)

(52) U.S. Cl.
CPC ......... *G06K 9/6267* (2013.01); *G06K 9/6215* (2013.01); *G06V 10/82* (2022.01)

(58) Field of Classification Search
CPC .. G06K 9/6267; G06K 9/6215; G06K 9/6256; G06V 10/82; G06N 3/0454
See application file for complete search history.

(56) References Cited

U.S. PATENT DOCUMENTS

2020/0334543 A1* 10/2020 Park ........................... G06F 7/57
2020/0380359 A1* 12/2020 Finnie .................. G06V 10/764

OTHER PUBLICATIONS

Zhao Heng et al.; "Few-Shot and many-shot Fusion Learning in Mobile Visual Food Recognition"; 2019 IEEE international symposium on Circuit and systems, IEEE, May 26, 2019, 5 pages.*
Yu-Xion Wang et al.; "Learning to Model the Tail"; 31st Conference on Neural information Processing Systems (NIPS 2017), Long Beach, CA, USA, Retrieved from the Internet on May 27, 2020, 11 pages.*
Zhao Heng et al., "Few-shot and Many-Shot Fusion Learning in Mobile Visual Food Recognition," 2019 IEEE International Symposium on Circuits and Systems, IEEE, May 26, 2019, 5 pages.
(Continued)

*Primary Examiner* — Shaghayegh Azima
(74) *Attorney, Agent, or Firm* — Norton Rose Fulbright US LLP; Gerard Messina

(57) ABSTRACT

A device for and computer implemented method of image content recognition and of training a neural network for image content recognition. The method comprising collecting a first set of digital images from a database, the first set of digital images is sampled from digital images assigned to a many shot class; creating a first training set comprising the collected first set of digital images; training a first artificial neural network comprising a first feature extractor and a first classifier for classifying digital images using the first training set; collecting first parameters of the trained first feature extractor, collecting second parameters of the trained classifier, determining third parameters of a second feature extractor of a second artificial neural network depending on the first parameters, determining fourth parameters of a second classifier for classifying digital images of the second artificial neural network.

17 Claims, 3 Drawing Sheets

(56) References Cited

OTHER PUBLICATIONS

Wei-Yu Chen et al., "A Closer Look at Few-Shot Classification", ICLR 2019, Retrieved from the Internet on May 27, 2020: https://openreview.net/pdf?id=HkxLXnAcFQ, 16 pages.

Yu-Xiong Wang et al., "Learning to Model the Tail", 31st Conference on Neural Information Processing Systems (NIPS 2017), Long Beach, CA, USA, Retrieved from the Internet on May 27, 2020: https://papers.nips.cc/paper/7278-learning-to-model-the-tail.pdf, 11 pages.

Jake Snell et al., "Prototypical Networks for Few-shot Learning", 31st Conference on Neural Information Processing Systems (NIPS 2017), Long Beach, CA, USA, Retrieved from the Internet on May 27, 2020: http://www.cs.toronto.edu/~zemel/documents/prototypical_networks_nips_2017.pdf, 11 pages.

\* cited by examiner

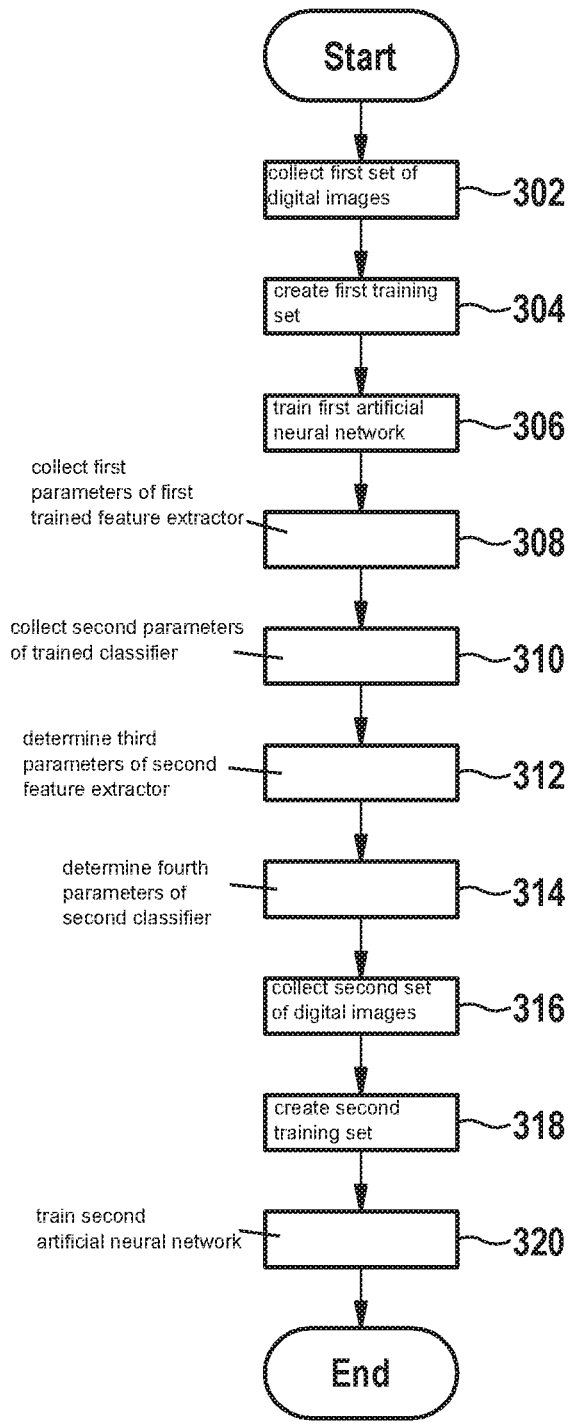
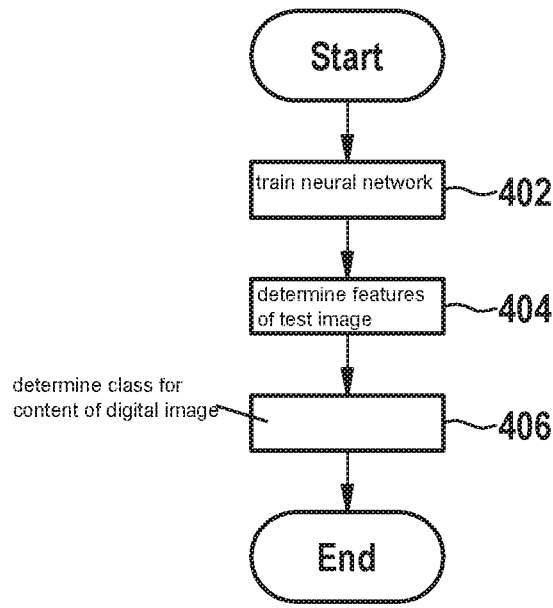
Fig. 3
Fig. 4

DEVICE AND METHOD OF DIGITAL IMAGE CONTENT RECOGNITION, TRAINING OF THE SAME

CROSS REFERENCE

The present application claims the benefit under 35 U.S.C. § 119 of European Patent Application No. EP 19177833.1 filed on Jun. 3, 2019, which is expressly incorporated herein by reference in its entirety.

FIELD

The present invention relates to a device and method of digital image content recognition, and a device and method of training the same.

BACKGROUND INFORMATION

ZHAO HENG ET AL: "Few-Shot and Many-Shot Fusion Learning in Mobile Visual Food Recognition", 2019 IEEE International Symposium on Circuits and Systems, IEEE, 26 May 2019, pages 1-5, describes aspects of Few-Shot and Many-Shot Fusion Learning and prototypical neural networks.

Artificial neural networks can be trained for digital image content recognition. Usually a feature extractor extracts features of a digital image and a classifier determines a class for the content of the digital image from a plurality of predetermined classes depending on the extracted features. In order to produce useful recognition, the artificial neural network is trained with training data. Good results are achievable when training data that is used for training the artificial neural network comprises many digital images in each class. When the training data is imbalanced in the sense that the training data comprises very view digital images in some classes while other classes have many digital images, the training of the artificial neural network is less effective. Consequently, it is difficult to provide a good digital image pattern recognition mechanism from such imbalanced training data. It is hence desirable to provide digital image contend recognition for a large number of extremely imbalanced classes in an efficient way.

SUMMARY

This foregoing may be achieved by an example device and example methods according to the present invention.

In accordance with an example embodiment of the present invention, a computer implemented method of training a neural network for image content recognition comprises collecting a first set of digital images from a database, wherein the first set of digital images is sampled from digital images assigned to a many shot class; creating a first training set comprising the collected first set of digital images; training in a first training stage a first artificial neural network comprising a first feature extractor and a first classifier for classifying digital images using the first training set; and in a second training stage collecting first parameters of the trained first feature extractor, collecting second parameters of the trained classifier, determining third parameters of a second feature extractor of a second artificial neural network depending on the first parameters, determining fourth parameters of a second classifier for classifying digital images of the second artificial neural network, wherein the second artificial neural network is or comprises the neural network, wherein the first parameters are weights of the first artificial neural network forming the trained first feature extractor, wherein the second parameters are weights of the first artificial neural network forming the trained first classifier, characterized in that the third parameters are weights of the second artificial neural network forming the second feature extractor, wherein the fourth parameters are weights of the second artificial neural network forming the second classifier, wherein the third parameters are the weights of the first artificial neural network forming the trained first feature extractor, wherein a weight of the trained first classifier is split to length and direction and a fourth parameter of the second classifier is determined based on the direction. This method provides a pretrained set of parameters for a prototypical neural network based e.g. on a training of a baseline neural network. The fourth parameters are prototypes, or semantically expected ground truth features. The similarity or the distance between the fourth parameters and test image features is then usable to classify the test image.

Advantageously, the example method comprises collecting a second set of digital images from the database, wherein the second set of digital images is sampled from digital images assigned to a few shot class; creating a second training set for a second stage of training comprising the second set of digital images, training the second artificial neural network using the second training set.

In the example embodiment of the present invention, advantageously, for the first training set digital images assigned to many shot classes are sampled, wherein for the second training set digital images assigned to few shot classes are sampled, the database comprising digital images assigned to the many shot classes and digital images assigned to few shot classes, wherein each many shot class comprises of more digital images than each few shot class. This improves the prototypical networks performance for training data equally sampling the same number of images from many shot classes and few shot classes.

In accordance with the example embodiment of the present invention, advantageously, the third parameters are weights of the first feature extractor, wherein the fourth parameters are prototypes of the second classifier. The term weights for example refers to weight vectors composed of a length and a direction. The weights are split to a length and a direction and the prototypes are determined based on the direction. These prototypes may be used without further training or are a good starting point for fine tuning training.

In accordance with the example embodiment of the present invention, advantageously, either the first classifier and the second classifier are distance based classifiers or the first classifier and the second classifier are similarity based classifiers, in particular either the first classifier is a cosine norm distance-based classifier and the second classifier is a second cosine norm distance-based classifier, or the first classifier is a first Euclidean norm distance-based classifier and the second classifier is a second Euclidean norm distance-based classifier, or the first classifier is a first cosine similarity based classifier and the second classifier is a second cosine similarity based classifier. While any classifiers that can calculate a distance or a difference between the features of digital train images and those of digital test images may be used, these are very efficient classifiers for the training.

In accordance with the example embodiment of the present invention, advantageously, the first classifier and the second classifier are cosine norm classifier adapted to determine the distance between a digital image feature determined by the second feature extractor and a trained image feature, wherein the second classifier has the weights of the first classifier. The calculation of the distance in feature space is very efficient and accurate using the pretrained weights. Without the feature space and pretrained weights the prototypical network cannot calculate features, or it has to train the first extractor from scratch as a backbone itself. With the pretrained feature space, a prototypical network can either fine-tune the model or just calculate features during the test time without fine-tuning.

In accordance with the example embodiment of the present invention, advantageously, in the second training stage centroids of training images of the second training set are determined. This produces a good training result.

In accordance with the example embodiment of the present invention, advantageously, in the second training stage nearest neighbor of training images of the second training set are determined. This produces a good training result.

In accordance with an example embodiment of the present invention, a method of digital image content recognition comprises training a neural network according to the method described above for nearest centroids, wherein depending on the trained neural network features of a test image are determined, wherein a distance in feature space of the features to a plurality of centroids is determined, wherein a nearest centroid in feature space is determined, and wherein a class for the content of the digital image is determined depending on a class of the nearest centroid. This provides a very effective content recognition.

Another method of digital image content recognition in accordance with the present invention comprises training a neural network according to the method described above for nearest neighbor, wherein depending on the trained neural network features of a test image are determined, wherein a distance in feature space of the features to a plurality of neighbor is determined, wherein a nearest neighbor in feature space is determined, and wherein a class for the content of the digital image is determined depending on a class of the nearest neighbor. This provides a very effective content recognition for digital image data having many digital images in few classes and few images in many classes.

Advantageously, in accordance with the example embodiment of the present invention, a confidence score is determined for the class for the content. This provides a certainty of the result. For example, if it's not certain, that the prediction for a certain digital image can be trusted, because the confidence score is lower than a threshold, this digital image might not belong to any class the model has been trained with.

In accordance with an example embodiment of the present invention, a device for image content recognition comprises a processor and a memory for an artificial neural network, that is configured for image content recognition according to the method described above.

In accordance with the example embodiment of the present invention, advantageously, the device comprises a first neural network, a second neural network and a transfer unit, configured to transfer parameters of the first neural network to the second neural network, wherein the transfer unit, is configured to transfer weights of a first feature extractor to a second feature extractor of the second neural network as weights of the second feature extractor, and/or to determine from weights of a first classifier prototypes of a second classifier of the second neural network, wherein the transfer unit is configured to split a weight of the first classifier to length and direction and to determine a prototype of the second classifier based on the direction.

Further advantageous embodiments are derived from the following description and the figures.

BRIEF DESCRIPTION OF THE DRAWINGS

FIG. 3 depicts steps in a training method for digital image content recognition in accordance with the present invention.

FIG. 4 depicts steps in a method for digital image content recognition in accordance with the present invention.

DETAILED DESCRIPTION OF EXAMPLE EMBODIMENTS

Figure 1:
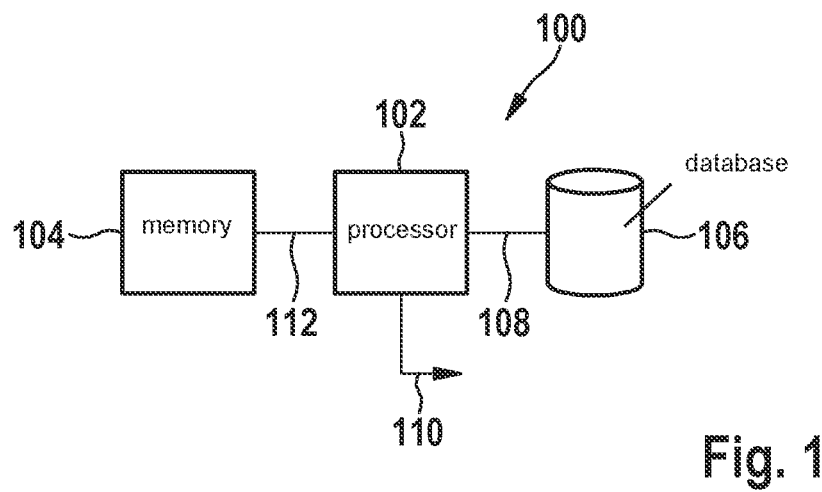
FIG. 1 depicts a schematic view of an example device for image content recognition in accordance with the present invention.

FIG. 1 depicts a device 100 for digital image content recognition in accordance with an example embodiment of the present invention. The device 100 comprises a processor 102 and a memory 104 for an artificial neural network. The device 100 may comprise or be connectable to a database 106 for digital images at an input 108. The device 100 may comprise an output 110 for outputting a result of the recognition. The processor 102 and the memory 104 a communicatively connected via a data link 112. The processor 102 may be a distributed computing system, a microprocessor or a microcontroller. Graphical processing units may be used as processors as well.

Figure 2:
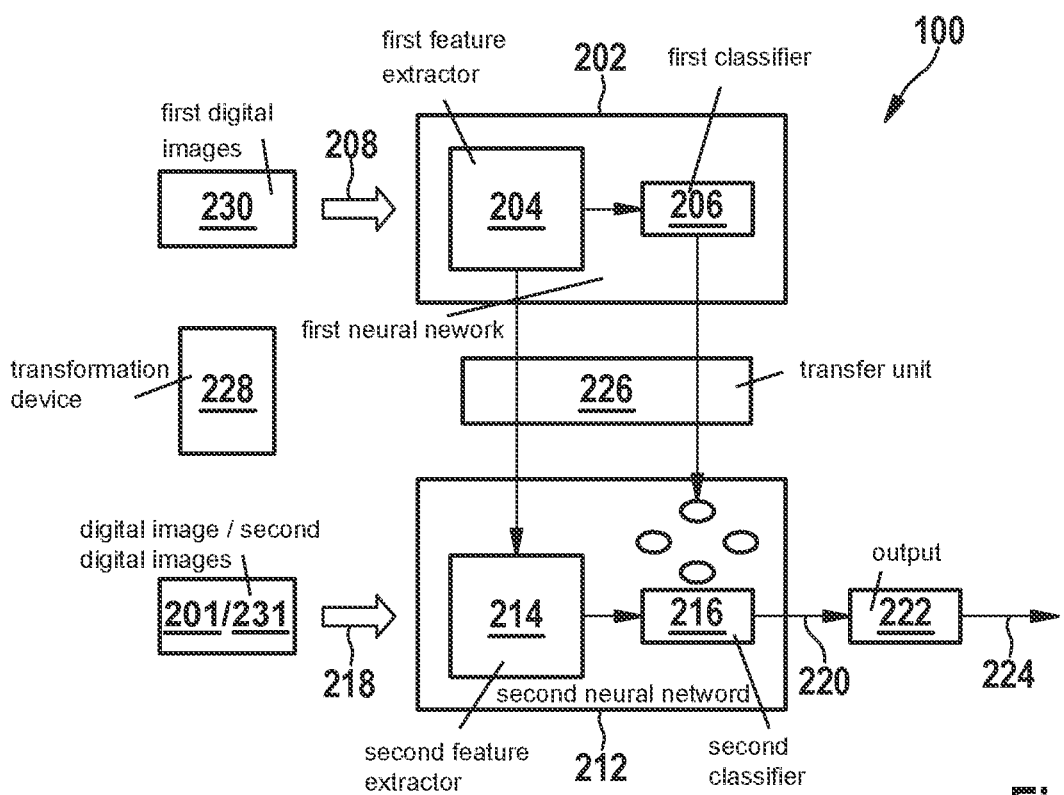
FIG. 2 depicts parts of the device.

FIG. 2 depicts schematically parts of the device 100. The device 100 comprises a first neural network 202 comprising a first feature extractor 204 and a first classifier 206. The first neural network 202 in the example is a baseline model neural network. The first feature extractor 204 may be a deep neural network, e.g., comprising multiple convolutional layers, a ResNet, or a AlexNet. The first classifier 206 is for example a cosine distance classifier. The first feature extractor 204 is configured to determine features of a content of the digital image received at an input 208 in a feature space.

The device 100 comprises a second neural network 212 comprising a second feature extractor 214 and a second classifier 216. The second neural network 212 in the example is a prototypical model neural network. The second feature extractor 214 is configured according to the configuration of the first feature extractor 204. The second classifier 216 is for example a cosine distance classifier. The second feature extractor 214 is configured to determine features of a content of the digital image 201 received at an input 218 in a feature space. The second classifier 216 is configured to classify the content of the digital image 201 into a class. The second classifier 216 is configured to output the class at an output 222.

The device 100 optionally comprises a confidence determination unit 222, configured to determine a confidence score of the class.

The device 100 comprises an output 224, configured to output a signal depending on the class and optionally on the confidence score. For example, for five classes the output 224 outputs a vector of scores. The length of the vector is equal to the number of classes, the class that has the highest score is the result of the prediction for the class, i.e. the class determined for the content of the digital image. For example: if the classifier outputs a vector [23, 21, 1, 10, 13], the prediction result is the first class which has the highest score 23. The second class has the score 21, the third class has the score 1, the fourth class has the score 10 and the fifth class has the score 13.

The device 100 comprises a transfer unit 226, communicatively connected to the first neural network 202 and the second neural network 212. The transfer unit 226 is configured to collect parameters of the first neural network 202, e.g. weights from the memory 104. The transfer unit 226 is configured to transfer parameters of the first neural network 202 to the second neural network 212. The transfer unit 226 is configured to transfer weights of the first feature extractor 204 to the second feature extractor 212 as weights of the second feature extractor 212. The transfer unit 226 is configured to transfer weights of the first classifier 206 to the second classifier 216 as weights of the second classifier 216. The transfer unit 226 is configured to write parameters of the second neural network 212, e.g. weights to the memory 104.

The transfer unit 226 transfers weights from the first feature extractor 204 to the second feature extractor 214 and transfers normalized weights, e.g., cosine similarity from the first classifier 206 to prototypes in the second neural network 212. The second classifier 216 calculates the prototypes using the second feature extractor 214. And part of the final prototypes will be replaced with the transferred prototypes from the first classifier 206.

For example, the second feature extractor 214 outputs the following five prototypes for five classes [1, 2, 3, 4, 5]. In an example the elements [1, 2] of the prototypes refer to many-shot classes which have been trained in the baseline model neural network and learned by a cosine distance classifier as first classifier 206. Then these elements [1, 2] are replaced with the cosine distance classifier's weights [1', 2']. The prototypes thus become [1', 2', 3, 4, 5].

The reason behinds it is that we only sample a few images per class when we calculate prototypes, so [1, 2] might not be as accurate as [1', 2'] since many shot classes in the baseline model have been sampled a lot more and well trained, so the centroids of [1', 2'] would be a lot more accurate than [1, 2].

This solves an imbalanced dataset problem without ensembling both models. In the example both use cosine distance classifiers to be mathematically correct. Otherwise [1',2'] wouldn't be in the same feature space as elements [3, 4, 5]. Other classifiers such as cosine similarity based classifiers may be used as well. The device 100 may contain a transformation device 228 adapted for applying one or more transformations to the digital image, in particular cropping, mirroring, rotating, smoothing, or contrast reduction, to create a modified digital image. The modified digital image may be received as part of the first training set 104 and/or the second training set 108 instead.

The device 100 is configured to process at the input 208 first digital images 230 assigned to M many shot classes. The device 100 is configured to process at the input 218 second digital images 231 assigned to F few shot classes. The database 106 for example comprises digital images in N=M+F classes for the content of the digital images. The database 106 may comprise U classes of digital images that are not used for training. In this case the database 106 comprises N=M+F+U classes for the content of the digital images.

The baseline neural network 202 in the example is configured to determine M outputs that correspond to the M many shot classes.

The prototypical neural network 212 in one aspect is configured to determine M outputs that correspond to the M many shot classes as well. Preferably, the prototypical neural network 212 is adapted to output M+F outputs that correspond to the M Many shot classes and the F few shot classes respectively. In one aspect the prototypical neural network 212 may have an output for one or more of the U classes of digital images that were not used for training.

The first feature extractor 204 may be adapted to determine a first score f1x for a digital image x. The first classifier 206 is adapted to classify the digital image into a class depending on the first score f1x. The second feature extractor 214 may be adapted to determine a second score f2x for a digital image x. The second classifier 216 is adapted to classify the digital image into the class depending on the second score f2x.

The device 100 is adapted to receive at the input 218 a digital image 201 to be classified. The digital image 201 may be captured from a digital image sensor. The device 100 may be adapted to output at the output 224 a signal for controlling a motion or an operating state of a vehicle, a robot, a machine in response to the digital image 201 depending on the class of the content. The sensor in one example is a LiDAR-, Radar-, Sonar-device or a camera. The class for the digital image content is in the example used in one aspect for deciding if the digital image 201 is relevant. In another aspect the class for the digital image content is used for determining a target or a control signal for this motion or for actuating. The control of the motion or operating state may refer to controlling an actuator, e.g. for avoiding an obstacle or for moving towards the target.

The parameters defining the baseline model neural network and the prototypical neural network may be stored in the memory 104 and are determined as described below. The trained baseline model neural network and the trained prototypical neural network may be stored in the memory 104 and are used as described next. Preferably, after the training of the prototypical neural network, solely the prototypical neural network is stored in memory of a device for digital image content recognition having an input for digital images and an output for a signal determined depending on the class determined by the prototypical neural network depending on the digital image.

The memory 104 in the example comprises computer readable instructions for a computer implemented e.g. programmatically implemented method of digital image content recognition. The memory 104 in the example comprises computer readable instructions for a computer implemented method of training the aforementioned neural networks.

According to one aspect, when a computer implemented method of training for digital image content recognition starts, a step 302 is executed.

Step 302 comprises collecting a first set of digital images from the database 106. The first set of digital images is sampled from digital images assigned to a many shot class.

Afterwards a step 304 is executed.

Step 304 comprises creating a first training set comprising the collected first set of digital images.

Afterwards a step 306 is executed.

Step 306 comprises; training in a first training stage a first artificial neural network comprising a first feature extractor and a first classifier for classifying digital images using the first training set. The first classifier is in the example a cosine norm classifier. In one aspect the first classifier is adapted to determine the distance between a digital image feature determined by the first feature extractor and a trained image feature.

The steps of the first training stage may be repeated in epochs using training images sampled for each epoch.

Afterwards a step 308 is executed.

Step 308 comprises and in a second training stage collecting first parameters of the trained first feature extractor. The first parameters in the example are weights of an artificial neural network forming the trained first feature extractor. The first classifier is a first cosine norm classifier.

Afterwards a step 310 is executed.

Step 310 comprises collecting second parameters of the trained classifier. In the example the second parameters are weights of the artificial neural network forming the trained classifier. In one aspect the second parameters are directions of weights that are mathematically equivalent to prototypes.

Afterwards a step 312 is executed.

Step 312 comprises determining third parameters of a second feature extractor of a second artificial neural network depending on the first parameters. In one aspect the third parameters are the weights of the artificial neural network forming the first feature extractor.

Afterwards a step 314 is executed.

Step 314 comprises determining fourth parameters of a second classifier for classifying digital images of the second artificial neural network. The fourth parameters in the example are prototypes of the second classifier. The fourth parameters are determined from the second parameters. In the example the prototypes are determined from the weights of the first classifier. The second classifier is a second cosine norm classifier or a cosine similarity classifier. If the first classifier is a cosine similarity classifier, the second classifier is a cosine similarity classifier. If the first classifier is a cosine distance classifier, the second classifier is a cosine distance classifier. When this condition is met, weight directions are mathematically equal to prototypes of matching head classes. This is used to transfer weights from the first classifier to the prototypes. When no weights are transferred both may be Euclidean norm distance-based classifiers.

Afterwards a step 316 is executed.

Step 316 comprises collecting a second set of digital images from the database. The second set of digital images is sampled from digital images assigned to a few shot classes.

Afterwards a step 318 is executed.

Step 318 comprises creating a second training set for a second stage of training comprising the second set of digital images.

Afterwards a step 320 is executed.

Step 320 comprises training the second artificial neural network using the second training set. In particular centroids or nearest neighbor for each class are determined. In one aspect the second classifier is adapted to determine the distance between a digital image feature determined by the second feature extractor and a trained image feature.

The second artificial neural network in the example is a prototypical neural network. In one aspect, in the second training stage centroids of training images of the second training set are determined. In another aspect in the second training stage nearest neighbor of training images of the second training set are determined.

The steps of the second training stage may be repeated in epochs using training images sampled for each epoch.

Afterwards the training ends.

The steps 316 to 320 are optional. The steps 316 to 320 are used to fine tune a pretrained feature extractor and classifier.

A method of digital image content recognition is described below referencing FIG. 4.

The method comprises a step 402 of training a neural network according to the method described above.

Afterwards the method comprises a step 404.

In the step 404 features of a test image are determined depending on the neural network. The neural network is a prototypical neural network that is either a finetuned model or a pretrained model directly using the information from the first feature extractor without finetuning. In case the prototypical neural network is fine-tuned, the centroids or prototypes for every class are calculated in finetuning during a training time. However, without fine-tuning the model, the second feature extractor remains unchanged, but only calculates prototypes, i.e., centroids or neighbors.

In one aspect of the present invention, a distance in feature space of the features to a plurality of centroids is determined. In another aspect of the present invention, a distance in feature space of the features to a plurality of neighbors is determined.

Afterwards the method comprises a step 406.

In the step 406 a class for the content of the digital image is determined.

In one aspect of the present invention, where the centroids are determined in step 404, a nearest centroid to the features determined in step 404 in feature space is determined, and the class for the content of the digital image is determined depending on a class of the nearest centroid.

In another aspect of the present invention, where the neighbors are determined in step 404, a nearest neighbor to the features determined in step 404 in feature space is determined, and the class for the content of the digital image is determined depending on a class of the nearest neighbor.

Afterwards the method ends.

Optionally, a confidence score is determined for the class for the content in step 406.

For the first training set digital images assigned to many shot classes are sampled. For the second training set digital images assigned to few shot classes are sampled. The database 106 comprises in the example digital images assigned to the many shot classes and digital images assigned to few shot classes, wherein each many shot class comprises of more digital images than each few shot class.

Figure 5:
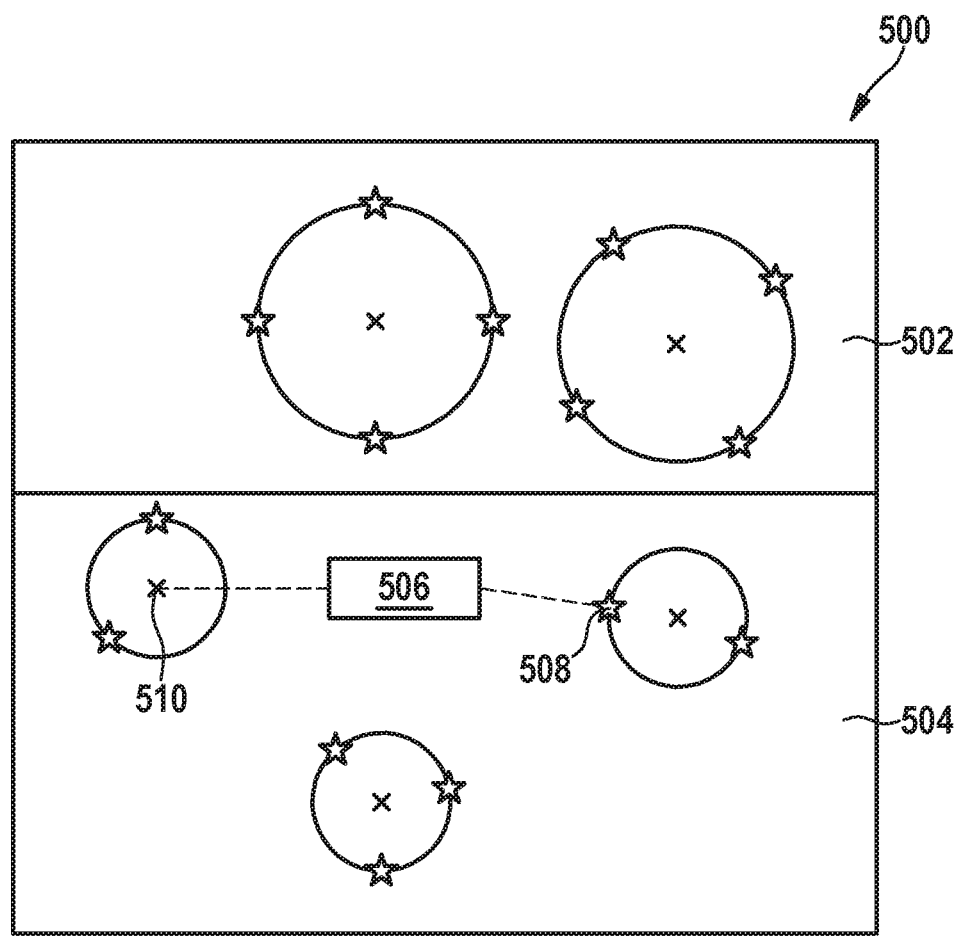
FIG. 5 depicts first aspects of a digital image content recognition method in accordance with the present invention.

An exemplary feature space 500 for the prototypical neural network is depicted in FIG. 5. Baseline prototypes 502 resulting from the baseline cosine norm classifier's weights are depicted in the upper part of FIG. 5. Few shot prototypes 504 are depicted in the lower part of FIG. 5. FIG. 5 is an example using nearest neighbor.

After transferring baseline's cosine classifier's weights to the prototypical neural network's feature space as prototypes, the distance from a test image's feature 506 is calculated in the same way for both, the many shot classes and the few shot classes. As depicted in FIG. 5, the test image's feature 506 is closer to a first star 508 representing a training image's feature, than the nearest centroid 510. When train images in the same class are very different from each other, this approach is very efficient, when the intra-class variance is high. This is in particular useful, when a test image is closer to a specific training image than the average feature of another cluster of training images.

Exemplary details of the many shot and the few shot classification as well as the baseline model neural network and the prototypical neural network are described for example in the following references:

"A CLOSER LOOK AT FEW-SHOT CLASSIFICATION", Wei-Yu Chen et al., ICLR 2019, available at https://openreview.net/pdf?id=HkxLXnAcFQ "Learning to Model the Tail", Yu-Xiong Wang et al., 31st Conference on Neural Information Processing Systems (NIPS 2017), Long Beach, Calif., US, available at https://papers.nips.cc/paper/7278-learning-to-model-the-tail.pdf.

"Prototypical Networks for Few-shot Learning", Jake Snell et al., 31st Conference on Neural Information Processing Systems (NIPS 2017), Long Beach, Calif., USA, available at http://www.cs.toronto.edu/~zemel/documents/prototypical_networks_nips_2017.pdf.

In a further aspect of the present invention, the digital image data may be augmented by applying one or more transformations to a digital image. A modified digital image may be created from the digital image sampled for one of the first training set or the second training set in particular by cropping, mirroring, rotating, smoothing, or contrast reduction to create the modified digital image.

In the example, when the digital image is a digital image assigned to the many shot class the modified digital image is also assigned for the first training set.

Likewise, when the digital image is a digital image assigned to the low shot class, the modified digital image is assigned to the second training set.

What is claimed is:

1. A computer implemented method of training a neural network for image content recognition, the method comprising the following steps:
    collecting a first set of digital images from a database, wherein the first set of digital images is sampled from digital images assigned to a many shot class;
    creating a first training set including the collected first set of digital images;
    training, in a first training stage, a first artificial neural network including a first feature extractor and a first classifier for classifying digital images using the first training set; and
    in a second training stage:
        collecting first parameters of the trained first feature extractor,
        collecting second parameters of the trained first classifier,
        determining third parameters of a second feature extractor of a second artificial neural network depending on the first parameters,
        determining fourth parameters of a second classifier for classifying digital images of the second artificial neural network,
        wherein the first parameters are weights of the first artificial neural network forming the trained first feature extractor,
        wherein the second parameters are weights of the first artificial neural network forming the trained first classifier,
        wherein the third parameters are weights of the second artificial neural network forming the second feature extractor,
        wherein the fourth parameters are weights of the second artificial neural network forming the second classifier,
        and
        wherein a weight of the trained first classifier is split to length and direction and a fourth parameter of the second classifier is determined based on the direction.

2. The method according to claim 1, further comprising the following steps:
    collecting a second set of digital images from the database, wherein the second set of digital images is sampled from digital images assigned to a few shot class;
    creating a second training set for the second stage of training including the second set of digital images; and
    training the second artificial neural network using the second training set.

3. The method according to claim 2, wherein for the first training set, digital images assigned to many shot classes are sampled, wherein for the second training set digital images assigned to few shot classes are sampled, the database including the digital images assigned to the many shot classes and digital images assigned to few shot classes, and wherein each many shot class comprises more digital images than each few shot class.

4. The method according to claim 1, wherein the third parameters are weights of the first feature extractor, and wherein the fourth parameters are prototypes of the second classifier.

5. The method according to claim 1, wherein either: (i) the first classifier and the second classifier are distance based classifiers, or (ii) the first classifier and the second classifier are similarity based classifiers.

6. The method according to claim 1, wherein either: (i) the first classifier is a first cosine norm distance-based classifier and the second classifier is a second cosine norm classifier, or (ii) the first classifier is a first Euclidean norm classifier and the second classifier is a second Euclidean norm distance-based classifier, or (iii) the first classifier is a first cosine similarity based classifier and the second classifier is a second cosine similarity based classifier.

7. The method according to claim 1, wherein the first classifier and the second classifier are cosine norm classifier adapted to determine the distance between a digital image feature determined by the second feature extractor and a trained image feature, wherein the second classifier has the weights of the first classifier.

8. The method according to claim 1, wherein, in the second training stage, centroids of training images of the second training set are determined.

9. The method according to claim 1, wherein, in the second training stage, nearest neighbor of training images of the second training set are determined.

10. A method of digital image content recognition, the method comprising the following steps:
    training a neural network for image content recognition, including:
        collecting a first set of digital images from a database, wherein the first set of digital images is sampled from digital images assigned to a many shot class;
        creating a first training set including the collected first set of digital images;
        training, in a first training stage, a first artificial neural network including a first feature extractor and a first classifier for classifying digital images using the first training set; and
        in a second training stage:
            collecting first parameters of the trained first feature extractor,
            collecting second parameters of the trained first classifier,
            determining third parameters of a second feature extractor of a second artificial neural network depending on the first parameters,
            determining fourth parameters of a second classifier for classifying digital images of the second artificial neural network,
            wherein the first parameters are weights of the first artificial neural network forming the trained first feature extractor, wherein the second parameters are weights of the first artificial neural network forming the trained first classifier,
wherein the third parameters are weights of the second artificial neural network forming the second feature extractor,
wherein the fourth parameters are weights of the second artificial neural network forming the second classifier,
wherein a weight of the trained first classifier is split to length and direction and a fourth parameter of the second classifier is determined based on the direction,
wherein, in the second training stage, centroids of training images of the second training set are determined;
wherein depending on the trained neural network, features of a test image are determined;
wherein a distance in feature space of the features to a plurality of centroids is determined;
wherein a nearest centroid in feature space is determined; and
wherein a class for content of the digital image is determined depending on a class of the nearest centroid.

11. A method of digital image content recognition, comprising the following steps:
training a neural network for image content recognition, including:
collecting a first set of digital images from a database, wherein the first set of digital images is sampled from digital images assigned to a many shot class;
creating a first training set including the collected first set of digital images;
training, in a first training stage, a first artificial neural network including a first feature extractor and a first classifier for classifying digital images using the first training set; and
in a second training stage:
collecting first parameters of the trained first feature extractor,
collecting second parameters of the trained first classifier,
determining third parameters of a second feature extractor of a second artificial neural network depending on the first parameters,
determining fourth parameters of a second classifier for classifying digital images of the second artificial neural network,
wherein the first parameters are weights of the first artificial neural network forming the trained first feature extractor,
wherein the second parameters are weights of the first artificial neural network forming the trained first classifier,
wherein the third parameters are weights of the second artificial neural network forming the second feature extractor,
wherein the fourth parameters are weights of the second artificial neural network forming the second classifier,
wherein a weight of the trained first classifier is split to length and direction and a fourth parameter of the second classifier is determined based on the direction,
wherein, in the second training stage, nearest neighbor of training images of the second training set are determined,
wherein, depending on the trained neural network features of a test image are determined;
wherein a distance in feature space of the features to a plurality of neighbors is determined;
wherein a nearest neighbor in feature space is determined; and
wherein a class for content of the digital image is determined depending on a class of the nearest neighbor.

12. The method according to claim 10, wherein a confidence score is determined for the class for the content.

13. The method according to claim 11, wherein a confidence score is determined for the class of the content.

14. A device for image content recognition, comprising:
a processor and a memory for an artificial neural network, the artificial neural network being configured for image content recognition by:
training the neural network for image content recognition, including:
collecting a first set of digital images from a database, wherein the first set of digital images is sampled from digital images assigned to a many shot class;
creating a first training set including the collected first set of digital images; training, in a first training stage, a first artificial neural network including a first feature extractor and a first classifier for classifying digital images using the first training set; and
in a second training stage:
collecting first parameters of the trained first feature extractor,
collecting second parameters of the trained first classifier,
determining third parameters of a second feature extractor of a second artificial neural network depending on the first parameters,
determining fourth parameters of a second classifier for classifying digital images of the second artificial neural network,
wherein the first parameters are weights of the first artificial neural network forming the trained first feature extractor,
wherein the second parameters are weights of the first artificial neural network forming the trained first classifier,
wherein the third parameters are weights of the second artificial neural network forming the second feature extractor,
wherein the fourth parameters are weights of the second artificial neural network forming the second classifier,
wherein a weight of the trained first classifier is split to length and direction and a fourth parameter of the second classifier is determined based on the direction,
wherein, in the second training stage, centroids of training images of the second training set are determined;
wherein depending on the trained neural network, features of a test image are determined;
wherein a distance in feature space of the features to a plurality of centroids is determined;
wherein a nearest centroid in feature space is determined; and wherein a class for content of the digital image is determined depending on a class of the nearest centroid.

15. A device for image content recognition, comprising:
a processor and a memory for an artificial neural network, the artificial neural network being configured for image content recognition;
wherein the device comprises a first neural network, a second neural network, and a transfer unit configured to transfer parameters of the first neural network to the second neural network;
wherein the transfer unit is configured to transfer weights of a first feature extractor to a second feature extractor of the second neural network as weights of the second feature extractor, and to determine from weights of a first classifier prototypes of a second classifier of the second neural network;
wherein the transfer unit is configured to split a weight of the first classifier to length and direction and to determine a prototype of the second classifier based on the direction.

16. A non-transitory computer readable storage medium on which is stored a computer program training a neural network for image content recognition, the computer program, when executed by a computer, causing the computer to perform the following steps:
collecting a first set of digital images from a database, wherein the first set of digital images is sampled from digital images assigned to a many shot class;
creating a first training set including the collected first set of digital images;
training, in a first training stage, a first artificial neural network including a first feature extractor and a first classifier for classifying digital images using the first training set; and
in a second training stage:
collecting first parameters of the trained first feature extractor,
collecting second parameters of the trained first classifier,
determining third parameters of a second feature extractor of a second artificial neural network depending on the first parameters,
determining fourth parameters of a second classifier for classifying digital images of the second artificial neural network,
wherein the first parameters are weights of the first artificial neural network forming the trained first feature extractor,
wherein the second parameters are weights of the first artificial neural network forming the trained first classifier,
wherein the third parameters are weights of the second artificial neural network forming the second feature extractor,
wherein the fourth parameters are weights of the second artificial neural network forming the second classifier,
and
wherein a weight of the trained first classifier is split to length and direction and a fourth parameter of the second classifier is determined based on the direction.

17. A method for image content recognition, comprising:
transferring, by a transfer unit of a device, weights of a first feature extractor of a first neural network of the device to a second feature extractor of a second neural network of the device as weights of the second feature extractor;
determining, by the transfer unit, prototypes of a second classifier of the second neural network from weights of a first classifier of the first neural network, wherein the determining splits a weight of the first classifier to length and direction and determines a prototype of the second classifier based on the direction; and
recognizing image content using the second neural network.

* * * * *